United States Patent Office 2,940,950
Patented June 14, 1960

2,940,950

BLENDED METHACRYLATE COATING COMPOSITIONS AND ARTICLES COATED THEREWITH

Samuel Gusman, Wyncote, Pa., assignor to Rohm & Haas Company, Philadelphia, Pa., a corporation of Delaware No Drawing. Filed Aug. 28, 1957, Ser. No. 680,671

19 Claims. (Cl. 260—32.8)

This invention relates to lacquers, lacquered articles, and lacquer finishing. It is particularly concerned with new lacquer compositions based on certain methacrylate copolymers and adapted to be applied by commercial spraying techniques. It is also concerned with the finishing of surfaces, especially of metals, with the lacquers of the present invention.

Poly(methyl methacrylate) is highly regarded as a coating material because of its durability, particularly its high retention of gloss and color, when pigmented, during prolonged outdoor exposure. Because of this quality, it has long been desired to use poly(methyl methacrylate) lacquers for the finishing of automobile bodies as well as other metallic articles subject to outdoor exposure. However, such lacquers have poor adhesion to metals directly and also poor adhesion to coatings obtained from primers of the "baking" type. While their adhesion to such primers can be somewhat improved by roughening of the exposed surface of such primer coatings, as by a sanding operation, and such roughening is frequently resorted to in any event to improve adhesion, the improvement thereby obtained is not as pronounced as would be desirable nor is it practical to roughen the primer in all of the indentations that are present in such structures as automobile bodies. It is characteristic of this system that the adhesion of the poly(methyl methacrylate) to the primer improves with age. Very shortly after application, however, there is insufficient adhesion between the primer coating and the poly(methyl methacrylate) coating to allow the application of masking tape when a multicolor pattern of decoration is desired. In such an event, the masking tape, when removed, removes the poly (methyl methacrylate) top coat. For this reason, the application of poly(methyl methacrylate) is considerably restricted.

Consequently, when poly(methyl methacrylate) lacquers are applied, a "non-baking" type of lacquer is generally applied as a primer or as an intermediate coat between the primer of "baking" type and the poly(methyl methacrylate) lacquer. Common non-baking lacquers that may be so used as a primer or intermediate coat contain nitrocellulose, such as a solution of nitrocellulose and a plasticizer therefor with or without additional film-forming materials, such as polyvinyl butyral.

In accordance with the disclosure of a copending application, Serial No. 680,672, filed on even date herewith, it has been found that the incorporation of 0.5% to 10% by weight, based on the total weight of the copolymer, of dimethylaminoethyl methacrylate into lower alkyl methacrylate polymers markedly enhances the adhesive properties of the polymers toward baking primers in general so that lacquers made therefrom can be applied directly over a baking primer without the necessity to employ an intermediate or sealer coat of a non-baking type. To obtain the optimum adhesion in conjunction with outdoor durability, the lacquers of the copending application use copolymers of lower alkyl methacrylate with 2% to 4% in the polymer molecule of dimethylaminoethyl methacrylate.

It has also been suggested heretofore that lacquers based on lower methacrylate polymers, that is polymers of methyl methacrylate or ethyl methacrylate can be improved with respect to adhesion to various substrates, such as paper, leather, textiles, glass, etc. when certain monomeric units are introduced into the polymer molecules by copolymerization. The particular nature of the group influences the improvement in adhesion obtained in that it may serve to increase adhesiveness toward substrates of one or several types but have little or no effect on the adhesiveness toward substrates of different character. For the purpose of the present application, monomers which improve the adhesion of the lower methacrylate polymers when copolymerized therein will be termed "adhesion-improving" or "adhesion-promoting" monomers, the units in the polymer derived from such units will be termed "adhesion-improving" units, and the characteristic group in the monomer or unit to which the improved adhesion is apparently attributable will be called the "adhesion-improving" group, it being always understood that the improvement obtained from any particular group, or unit or monomer containing it, may be quite specific in that it may depend on a particular substrate or type of substrate.

In accordance with the present invention, it has been discovered that markedly greater improvement in adhesion can frequently be obtained with lower methacrylate lacquers if the lacquer is made up of a mixture of polymer molecules containing few or no adhesion-imparting units with other polymer molecules containing a relatively large proportions of adhesion-imparting units. For example, it has been discovered that a lacquer containing an 80:20 weight ratio mixture of a homopolymer of methyl methacrylate with a copolymer of 95% by weight of methyl methacrylate with 5% of a certain adhesion-improving comonomer has (1) markedly improved adhesion to a primed metal surface as compared to a lacquer containing only a copolymer of 99.0% by weight of methyl methacrylate with 1.0% of said comonomer, and (2) substantially as good adhesion as a lacquer containing only a copolymer of 97.5% by weight of methyl methacrylate with 2.5% by weight of said comonomer.

The lacquers of the present invention thus comprise a blend of a methacrylate polymer containing few or preferably no adhesion-improving units with a methacrylate copolymer containing a relatively large content (as compared to the first-mentioned polymer) of adhesion-improving units. Numerous advantages are obtained. The adhesive-containing monomer, which is usually relatively expensive by comparison to the lower methacrylate, is used far more efficiently in the blended lacquer system, and consequently the cost is substantially reduced for obtaining a given improvement in adhesion. When certain systems are involved such that a lacquer using only a copolymer of the methacrylate with the adhesion-improving comonomer requires that the copolymer contain a large proportion of the adhesion-promoting comonomer, such as 5 to 15% or more by weight, in order to provide the desired level of adhesion to a particular substrate, the use of such a large proportion of the comonomers may incur some detrimental effect on other properties of the methacrylate lacquer or coating, such as increased sensitivity to moisture or to particular solvents. In such event, the blended system frequently provides the desired adhesion without appreciable deterioration of the other desirable properties obtainable from the use of a lacquer based on the methacrylate polymer unmodified by adhesion-imparting units.

While the present invention is not to be limited by any particular theory of operation, the following explanation may be the basis for the improvement in adhesion obtained by the blended lacquers of the present invention. Adhesion depends on the nature of contact at the boundary between two adhered materials, e.g. the substrate and a coating thereon. The presence of the adhesion-improving groups in the film-forming methacrylate polymer lacquer improves the adhesion and such improvement is due to some interaction, physical or physicochemical in nature, between the substrate and the adhesion-improving groups in the polymer molecules. Such interaction probably involves a preferential adsorption of the adhesion-improving groups on the substrate. If all the polymer molecules are of the same constitution and contain approximately the same proportion of adhesion-improving groups, the extent of preferential adsorption is limited by the fact that all the molecules are the same. However, by providing certain polymer molecules with a greater proportion than others of the adhesion-improving groups, their mobility, in the lacquer during the period following deposition before solidification during drying occurs, permits the migration of such polymer molecules to the interface where they are preferentially adsorbed and can exert their interaction more strongly than would be possible if all of the molecules contained the same proportion of adhesion-improving groups, assuming that the overall composition of the film-forming polymer in the lacquer is such that, in each case, the same percentage by weight of adhesion-improving groups is present in the film-forming polymer molecules of the lacquers when the proportion is calculated on the basis of total weight of film-forming methacrylate polymer molecules whether they contain or do not contain adhesion-promoting groups.

The lacquers of the present invention, therefore, in all cases comprise a blend of a base polymer with a modifying polymer containing adhesion-promoting groups. This polymer blend is dissolved in suitable solvents with or without external plasticizers. The base polymer may simply be composed of a homopolymer of methyl methacrylate or ethyl methacrylate or it may be composed of a copolymer of a mixture consisting of methyl methacrylate with ethyl methacrylate or it may be composed of any mixture of these polymers. The base polymer may alternatively be composed of a copolymer of one of the aforementioned lower methacrylates with other esters of acrylic acid or methacrylate acid with an alcohol having from 1 to 18 carbon atoms, the proportion of the lower methacrylate being sufficient to provide the hardness desired in the particular coating application. Preferably the alcohols contain from 1 to 4 carbon atoms such as methanol, ethanol, propanol or a butanol. The base polymer may also contain minor amounts up to 2% by weight of an acid such as acrylic acid, methacrylic acid or itaconic acid and the base polymer may, if desired, contain a proportion not over 50% by weight and preferably not over 10% by weight of neutral monomers other than esters of acrylic acid or methacrylic acid, such neutral monomers including acrylonitrile, methacrylonitrile, styrene, vinyl acetate, etc. The base polymer may also be composed of any mixture of the various homopolymers and/or copolymers described in this paragraph.

The term "polymer of a lower alkyl methacrylate," when employed herein, includes homopolymers of methyl or ethyl methacrylate, copolymers of methyl and ethyl methacrylate, copolymers of methyl and/or ethyl methacrylate with other materials copolymerizable therewith containing a substantial amount of methyl or ethyl methacrylate e.g. at least 25% by weight of either or a total weight of both, when both are present, of at least 25% by weight, and mixtures of any of such homopolymers and copolymers.

Besides the lower methacrylate base polymer which preferably contains no adhesion-promoting or adhesion-improving groups, the lacquer of the present invention includes a modifying polymer containing such adhesion-promoting groups. While there may be exceptional situations wherein homopolymers of monomers containing the adhesion-promoting groups may be used as the modifying polymers, it is more generally the case that the modifying polymer is a copolymer of monomer units of the same or similar character as those making up the base polymer with from about 2 to 15% or more of the adhesion-promoting units. Preferably such copolymers contain about 4% to 10% of the adhesion-promoting units. By providing in the modifying polymer a large proportion of units of a character similar to, or the same as, those of the base polymer, it is generally possible to obtain excellent compatibility of the polymers in the final coatings.

In the blend of base polymer or polymers with the modifying polymer or polymers, the proportion of adhesion-promoting units should be at least 0.1% by weight of the total weight of base and modifying polymer blend and may be as high as 10% or more but in most cases, it is undesirable to exceed 8% by weight.

Adhesion-favoring monomers include compounds of Formulas I, II, and III following:

(I) 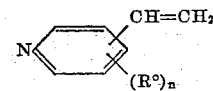

where $R°$ is selected from the group consisting of H and alkyl groups having 1 to 4 carbon atoms, and $n$ is an integer having a value of 1 to 4, (II) $\quad CH_2=C(R)AYNR^1R^2$ where R is selected from the group consisting of H and $CH_3$,
A is selected from the group consisting of O, S,

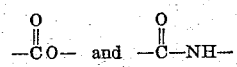

Y is an alkylene group having 2 to 4 carbon atoms,
$R^1$ is selected from the group consisting of H and an alkyl group having 1 to 4 carbon atoms, and
$R^2$ is selected from the group consisting of H and an alkyl group having 1 to 4 carbon atoms, (III) 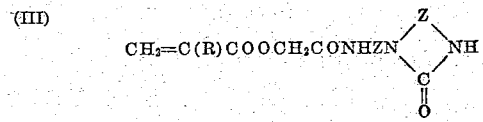

where R is the same as above, and Z is an alkylene group having 2 to 3 carbon atoms.

Examples of compounds of Formula I include: 2-vinylpyridine; 3-vinylpyridine; 4-vinylpyridine; 2-methyl-5-vinylpyridine; 5-methyl-2-vinylpyridine; 4-methyl-2-vinylpyridine; 2-ethyl-5-vinylpyridine; 2,3,4-trimethyl-5-vinylpyridine; 3,4,5,6-tetramethyl-2-vinylpyridine; 3-ethyl-5-vinylpyridine; 2,6-diethyl-4-vinylpyridine.

Examples of compounds of Formula II include:

Dimethylaminoethyl acrylate and methacrylate
Diethylaminoethyl acrylate and methacrylate
Dimethylaminopropyl acrylate and methacrylate
Diethylaminopropyl acrylate and methacrylate
Dipropylaminoethyl acrylate and methacrylate
Di-n-butylaminoethyl acrylate and methacrylate
Di-sec-butylaminoethyl acrylate and methacrylate
Di-t-butylaminoethyl acrylate and methacrylate
Dimethylaminoethyl vinyl ether and sulfide
Diethylaminoethyl vinyl ether and sulfide
Aminoethyl vinyl ether and sulfide
Monomethylaminoethyl vinyl ether and sulfide
N,N-dimethylaminoehyl acrylamide and methacrylamide
N,N-diethylaminoethyl acrylamide and methacrylamide Examples of compounds of Formula III include:

N-[β-(α-methacryloxyacetamido)ethyl]-N,N'-ethyleneurea

N-[β-(α-acryloxyacetamido)ethyl]-N,N'-ethyleneurea

N-[β-(α-acryloxyacetamido)ethyl]-N,N'-trimethyleneurea

N-[β-(α-methacryloxyacetamido)ethyl]-N,N'-trimethyleneurea

Another type of adhesion promoting monomer is that of Formula IV

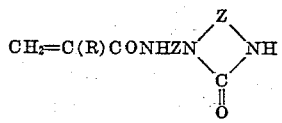

(IV)

where R and Z are defined above, of which an example is N-[β-(methacrylamido)ethyl]-N,N'-ethyleneurea.

The viscosity average molecular weight of the lower alkyl methacrylate polymers (both the base and the modifying polymers) may be in the range of 40,000 to 150,000 and particularly in the case of automotive lacquers is preferably between 90,000 and 130,000. By using copolymers in these ranges and especially in the latter of them, it is possible to produce sprayable lacquers of high solids, such as from about 12 to 20% by weight of non-volatile solids concentration. The copolymers may be prepared by granular, emulsion, or solution polymerization of the several comonomers and, if desired, a portion having a preferred narrow range of molecular weight may be extracted from the products of such polymerization procedures by preferential solvent techniques in accordance with well-known practice. A preferred method of preparing the copolymers involves introducing suitable proportions of the comonomers with a solvent which may be a solvent for both the monomers and the copolymer and with a catalyst, such as one of the well-known organic peroxide catalysts, such as benzoyl peroxide, or one of the well-known azo catalysts, such as α,α'-azodiisobutyronitrile, into a reaction vessel in which the mixture is heated with continuous agitation for a period of 2 to 9 hours followed by cooling.

The lacquer may contain one or more external plasticizers in an amount up to 50% by weight of the weight of the comonomer. Examples of plasticizers that are suitable include benzyl butyl phthalate, dibutyl phthalate, triphenyl phosphate, 2-ethyl hexyl benzyl phthalate and dicyclohexyl phthalate. Other well-known plasticizers for polymers of methyl and ethyl methacrylates which may be employed include diallyl phthalate, dibenzyl phthalate, butyl cyclohexyl phthalate, mixed benzoic acid and fatty oil acid esters of pentaerythritol, poly(propylene adipate) dibenzoate, diethylene glycol dibenzoate, tetrabutylthiodisuccinate, butyl phthalyl butyl glycolate, acetyl tributyl citrate, dibenzyl sebacate, tricresyl phosphate, toluene ethyl sulfonamide, the di-2-ethylhexyl ester of hexamethylene diphthalate, and di(methylcyclohexyl) phthalate. The particular plasticizer and the amount thereof used are chosen in accordance with the demand for compatibility.

Various solvents may be employed, such as toluene, xylenes, acetone, methyl ethyl ketone, methyl isobutyl ketone, methyl isopropyl ketone, amyl alcohol, 2-ethoxyethyl acetate, ethyl acetate, butyl lactate, amyl acetate, methyl acetate, denatured ethyl alcohol, isopropanol, diacetone alcohol, cyclohexanol, ethylene dichloride, diisobutyl ketone, cyclohexanone, 2-butoxyethanol, furfuryl, petroleum naphtha, boiling in the range of about 87° to about 145° C., cyclohexane, hexane, aromatic hydrocarbon mixtures, and also various aliphatic, naphthenic and aromatic naphthas. While certain of these solvents cannot be used alone because of lack of solvent power for the copolymers, they can in a mixture with others. Obviously, mixtures of such solvents are generally quite useful.

The selection of a particular adhesion-promoting monomer may depend upon the particular nature of the substrate. Substrates that may be employed include all sorts of metals such as steel, aluminum, copper, brass, bronze, tin, chromium, wrought iron, as well as substrates of wood, paper, cardboards, textiles, leather, stone, masonry, brick, plastics, glass, linoleum, asbestos cement shingles or other structures, etc. However, the system of the present invention is particularly valuable for the coating of metals which may or may not be provided with a primer coating. For this reason the description of the invention hereinafter will more particularly refer to the application of the coating compositions of the present invention to metals whether primed or not.

The lacquers of the present invention may be applied over a wide variety of baking primer coats used on metals including the drying oil-modified alkyds, rosin-modified alkyds, mixtures of an alkyd and an aminoplast, which may or may not be co-reacted, mixtures of an alkyd and an epoxy resin, which may or may not be co-reacted, mixtures of an alkyd with an aminoplast and with an epoxy resin which may or may not be co-reacted, mixtures of epoxidized esters of higher fatty acids with an aminoplast resin, which may or may not be co-reacted, and so on.

The incorporation of the modifying polymers into lacquers containing lower methacrylate base polymers has been found to improve the adhesion of the coatings contained without appreciably modifying the good qualities of the lower alkyl methacrylate polymer coating, especially in respect to hardness, flexibility, and durability of gloss and color on outdoor exposure. The adhesion has been found to be enhanced with respect to baked primers so that the use of masking tape in the application of multi-color designs has been found permissible. The use of a greater proportion of adhesion-promoting units than about 8 to 10% by weight, based on total weight of base polymer and modifying polymer, has been found to be undesirable in many cases because of noticeable loss in the desirable qualities obtained from the lower alkyl methacrylate component in the coatings. Generally, the optimum qualities of adhesion and durability of gloss and color are obtained when the adhesion-improving units are used in the range of about 1% to 4% by weight of the total weight of base and modifying polymers and, accordingly, this range is preferred.

While, for certain purposes, a clear lacquer may be employed, it is quite general to include pigments in an amount up to 100% by weight of the polymer in the lacquer finishing compositions. Examples of suitable pigments include titanium dioxide, carbon black, iron blues, phthalocyanine blues and greens; metal oxides, hydroxides, sulfides, sulfates, silicates and chromates; aluminum flake, bronze powders, and various fillers or extenders such as talc, barytes, china clay and diatomaceous earth.

It will be obvious to those skilled in the organic coating art that the amount of pigment may be varied widely, depending on the effect desired. The amount of pigment, by weight based on the weight of the organic film-forming material, may vary between about 2% for light, high-hiding pigments, such as carbon black, and about 100% for heavy, low-hiding pigments such as lead chromate.

It is common practice in the coating art to prepare liquid coating compositions on a commercial basis in a highly concentrated form. In comparison with the same composition in a thinned or diluted form ready for application, the concentrated form is more resistant to pigment settling during storage, is cheaper to store and ship because less weight and space are involved, and is in a more adaptable condition for the addition of thinning and/or other modifying materials by the ultimate user to adjust the composition to his own liking. Therefore, the concentrated coating compositions from which the lacquers of this invention may be prepared by merely admixing appropriate organic liquids form a part of this invention. The maximum degree of concentration, i.e. the maximum non-volatile solids content, is limited only by the maximum consistency which can be conveniently handled by the manufacturer and the ultimate user. While concentrated lacquers having a non-volatile solids content of 75% by weight, or even higher, may be prepared; the normal concentration is usually between 30 and 60%. The minimum concentration is obviously the solids content of the ready-to-apply lacquers; but, as previously mentioned, such compositions are not usually prepared by the manufacturer because they are not adaptable to adjustment by the user.

The method of dispersing or grinding pigment in the film-forming materials is not critical provided a smooth, uniform dispersion of finely divided pigment is produced. Examples of suitable equipment well known in the art are ball, pebble, buhrstone, roller, and colloid mills and kneader-mixers, such as Banbury or Werner-Pfleiderer.

The concentrated lacquers may be reduced to whatever concentration is suitable for the particular manner of application. The application concentration may vary from about 5 to 30% non-volatile solids (that is, including plasticizer), depending upon the manner of application and the thickness of coating desired. For spraying, the concentration may be between 10 and 20% solids.

While the preferred lacquers of this invention contain, as film-forming materials, blends of only the base and modified polymers of methyl or ethyl methacrylate of the present invention and, if desired, plasticizers therefor, suitable lacquers may also be prepared by incorporating other compatible film-forming materials with the aforementioned ingredients. Examples of such additional film-forming materials are cellulose nitrate, other cellulose esters, and polymers of the short chain alkyl esters of acrylic and methacrylic acids other than ethyl and methyl methacrylate, the choice being dictated by the requirement for compatibility. Obviously it is most convenient to incorporate the additional film-forming materials in the form of solutions.

The coatings may be air-dried under normal conditions of atmospheric temperature and humidity with good ventilation. Air-drying to a state which permits handling may require 4 to 24 hours. Higher temperatures of drying may be employed, such as from about 140° to about 300° F. or more. The use of such elevated temperatures reduces the drying time so that drying at 150° to 200° F. may be fully accomplished in 30 to 60 minutes whereas the use of 250° to 300° F. generally shortens the time considerably.

The coating compositions of this invention are useful for applying decorative and protective coatings to articles manufactured from a variety of materials, such as wood, metal, ceramics, linoleum, vinyl resin tiles, and other organic and inorganic substances. While conventional air-spraying is the preferred method of applying the products of this invention, obviously other methods may be used, such as hot air spraying, steam spraying, electrostatic spraying, spraying a preheated coating composition, dipping, brushing, and roller-coating.

The blends may be prepared by simply mixing a solution of the base polymer with a solution of the modifying polymer. Instead of preparing the solutions separately and then mixing them, the blends may be prepared by preparation of the two polymers in a single solution. This may be done by first mixing the monomers which form the base polymer in a solvent and polymerizing only a part thereof, say about three-fourths, adding the adhesion-promoting monomer at this stage and completing the polymerization. Alternatively the first mixture of monomers may be polymerized practically completely at which point there is added a mixture of the several monomers required to produce the modifying copolymer and these are then polymerized in the common solution. Alternatively the monomers required for making the modifying copolymer are first dissolved in the solvent and polymerized, after which the monomers which are needed to form the base polymer are added to the polymer solution and polymerized therein. Examples A through J illustrate preparation of typical modifying copolymers which are to be blended with a base polymer by mixing. Examples K through O illustrate the preparation of solutions containing both base polymer and modifying polymer by polymerization of the monomeric components thereof in a single solution.

In the following examples which are illustrative of the present invention, the parts, percentages, and ratios are by weight unless otherwise indicated. Also, the adhesiveness (except where microknife tests are mentioned) was tested by scribing X-shaped marks in the coating, applying Scotch tape to the marks, pressing the tape firmly against the coated surface by rubbing with a rubber pencil eraser. The tape is then removed by lifting while pulling in a direction parallel to the plane of the surface so that the angle the tape makes as it leaves the surface is a small acute angle on the order of 15°. The test is done at two periods, the first about 10 to 30 minutes after the completion of the baking of the topcoat, the coating being cooled before application of the tape, and the second a day later.

EXAMPLE A

A solution comprising 949 parts of methyl methacrylate, 51 parts of dimethylaminoethyl methacrylate, 2.5 parts of azobisisobutyronitrile and 670 parts of toluene is added in the course of two hours to a five-liter flask maintained at 80° C. by means of external heating. The mixture in the flask is stirred during the addition and subsequent reaction and maintained at 80–85° C. The mixture is then diluted with 830 parts of toluene over a two-hour period while stirring is continued at a temperature of 80–82° C. Heating and stirring are continued for a total of 12 hours and the mixture diluted with toluene to 30% resin solids (approximately 830 parts of toluene). The Gardner-Holdt viscosity is O (3.7 poises). The copolymer contains approximately 5.1% of dimethylaminoethyl methacrylate.

EXAMPLE B

The procedure of Example A is repeated substituting for the comonomers, 920 parts of methyl methacrylate and 80 parts of diethylaminoethyl methacrylate. The copolymer contains approximately 8% of diethylaminoethyl methacrylate and is dissolved at 30% solids in toluene.

EXAMPLE C

The procedure of Example A is repeated substituting for the comonomers 725 parts of methyl methacrylate, 210 parts of ethyl acrylate, and 65 parts of dimethylaminoethyl acrylate yielding a copolymer containing 6.5% of the last-named comonomer.

EXAMPLE D

The procedure of Example A is repeated substituting for the comonomers 800 parts of ethyl methacrylate, 100 parts of butyl acrylate and 100 parts of dimethylaminoethyl methacrylate yielding a copolymer containing about 10% of the last-named comonomer.

EXAMPLE E (a) A solution consisting of 12.7 grams (2.5 mole percent) N - [β-(α-methacryloxyacetamido)ethyl]-N,N′-ethyleneurea, 195.0 grams (97.5 mole percent) methyl methacrylate, 106.8 grams of toluene, 63.5 grams of 2-methoxy-ethanol (to make a 55% solution of monomers), and 0.52 gram (0.25%) azodiisobutyronitrile is added in the course of two hours to a glass reaction vessel provided with a nitrogen atmosphere and maintained at 80° C. by means of external heating. The mixture in the flask is stirred during the addition and subsequent reaction and maintained at 80° to 85° C. The mixture is then diluted with 141.0 grams of toluene over a one hour period while stirring and heating are continued at a temperature of 80° to 82° C. Two, four, and six hours after the polymerization has started the reaction is re-catalyzed with 0.21 gram of additional azodiisobutyronitrile. Heating and stirring are continued for a total of eight hours and the mixture diluted with toluene to 30% resin solids (approximately 173.5 grams of toluene). The Gardner-Holdt viscosity is U. The copolymer contains approximately 93.9% by weight of methyl methacrylate and 6.1% of the urea derivative in a solvent system containing toluene and 2-methoxyethanol in the ratio of 86.9:13.1.

(b) The procedure of part (a) hereof is repeated using proportions of the two monomers which result in copolymers as follows:

(1) 95% by weight of methyl methacrylate and 5% of the urea derivative in a toluene/2-methoxyethanol (89.2:10.8) solvent system.

(2) 92.7% by weight of methyl methacrylate and 7.3% of the urea derivative in a toluene/2-methoxyethanol (84.2:15.8) solvent system.

(c) The procedure of part (a) hereof is repeated replacing part of the methyl methacrylate with approximately 0.9 gram of methacrylic acid.

EXAMPLE F

A mixture of 273 grams of methyl methacrylate, 166.5 grams of butyl methacrylate, 25.4 grams of N-[β-(α-methacryloxyacetamido)ethyl] - N,N'-ethyleneurea, and 500 grams of ethoxyethyl acetate is heated in a glass vessel provided with a nitrogen atmosphere to 70° to 75° C. Then 4 grams of azodiisobutyronitrile is added while agitating. After the third and fifth hours at 75° to 80° C., solutions of 2 grams of the azodiisobutyronitrile in 50 grams of ethoxyethyl acetate are added. Three hours later, the reaction mixture is filtered giving a solution of the ternary copolymer having a Gardner-Holdt viscosity of Z–6 at 42.2% solids.

EXAMPLE G

The procedure of Example A is repeated replacing the dimethylaminoethyl methacrylate with 80 parts of 4-vinylpyridine.

EXAMPLE H

The procedure of Example A is repeated replacing the dimethylaminoethyl methacrylate with 80 parts of N-(β-dimethylaminoethyl)acrylamide.

EXAMPLE I

The procedure of Example A is repeated replacing the dimethylaminoethyl methacrylate with 80 parts of dimethylaminoethyl vinyl ether.

EXAMPLE J

The procedure of Example A is repeated replacing the dimethylaminoethyl methacrylate with 80 parts of N-[β-(methacrylamido)ethyl]-N,N'-ethyleneurea.

EXAMPLE K

An initial charge comprising 400 parts of methyl methacrylate and 1.0 part of azodiisobutyronitrile is added in the course of one hour to a glass reaction vessel containing 267.5 parts of toluene maintained at 80° C. by means of external heating. The mixture in the flask is stirred during the addition and subsequent reaction and maintained at 80° to 85° C. under a nitrogen atmosphere. The mixture is then diluted with 332.5 parts of toluene over a one-hour period while stirring and heating are continued at a temperature of 80° to 82° C. At the end of two hours (the conversion being about 90%) a second charge comprising 95.0 parts of methyl methacrylate, 5 parts of N-[β-(α-methacryloxyacetamido)ethyl]-N,N'-ethyleneurea, 0.25 part of azodiisobutyronitrile, and 25.0 parts of 2-methoxy-ethanol is added in the course of one hour to the same reaction vessel, thus utilizing the heated methyl methacrylate resin solution as the reaction media. Stirring and heating are continued and a reaction temperature of 80° to 82° C. maintained. After the fifth hour, the mixture is again diluted with an adidtional 125.0 parts of toluene over a one-hour period. Four, six, and eight hours after the initial polymerization has started the overall reaction is recatalyzed with 0.1 part of additional azodiisobutyronitrile. Heating and stirring are continued for a total of 12 hours and the mixture diluted with toluene to 30% solids (approximately 418.3 parts of toluene). The Gardner-Holdt viscosity is Q. The final product is a clear, viscous solution. It is essentially a blend containing 99.0% by weight of methyl methacrylate and 1.0% of the urea derivative.

EXAMPLE L

The procedure of Example K is repeated substituting for the second charge 192.8 parts of methyl methacrylate, 15.2 parts of the same urea derivative there used, 0.52 part of azodiisobutyronitrile, and 76.0 parts of 2-methoxy-ethanol. This composition, when diluted with toluene to 30% resin solids, results in a final blend containing 97.5% by weight of methyl methacrylate and 2.5% of the urea derivative.

EXAMPLE M

The procedure of Example K is repeated substituting for the initial monomer charge 240.0 parts of methyl methacrylate and 160.0 parts of butyl methacrylate; and also substituting for the second charge 76.0 parts of methyl methacrylate, 50.6 parts of butyl methacrylate, 6.7 parts of the urea derivative there used, 0.33 part of azodiisobutyronitrile, and 33.5 parts of 2-methoxyethanol. This composition, when diluted with toluene to 40% resin solids, results in a final blend containing 59.25% by weight of methyl methacrylate, 39.5% of butyl methacrylate, and 1.25% of the urea derivative.

EXAMPLE N

The procedure of Example K is repeated substituting for the initial monomer charge 398.3 parts of methyl methacrylate and 1.7 parts of methacrylic acid; and also substituting for the second charge 139.4 parts of methyl methacrylate, 11.0 parts of the same urea derivative, 0.6 part of methacrylic acid, 0.38 part of azodiisobutyronitrile, and 55.0 parts of 2-methoxy-ethanol. This composition, when diluted with toluene to 30% resin solids, results in a final blend containing 97.58% by weight of methyl methacrylate, 2.0% of the urea derivative, and 0.42% of methacrylic acid.

EXAMPLE O

The procedure of Example K is repeated substituting for the initial monomer charge 278.8 parts of methyl methacrylate, 119.6 parts of ethyl acrylate, and 1.6 parts of methacrylic acid; and also substituting for the second charge 264.8 parts of methyl methacrylate, 113.6 parts of ethyl acrylate, 20.0 parts of the same urea derivative, 1.6 parts of methacrylic acid, 1.0 part of azodiisobutyronitrile, and 100.0 parts of 2-methoxy-ethanol. This composition, when diluted with toluene to 40% resin solids, results in a final blend containing 67.95% by weight of methyl methacrylate, 29.15% of ethyl acrylate, 2.5% of the urea derivative, and 0.4 part of methacrylic acid.

EXAMPLE 1

(a) A primer is prepared by ball-milling a mixture of 156 parts of iron oxide, 78 parts of zinc chromate, 26 parts of micronized talc, 233 parts of a 60% solids solution in xylol of a tall oil fatty acid modified epoxyalkyd obtained by the condensation of an isopropylidene-bis-phenol/epichlorohydrine condensate with phthalic anhydride and glycerol, and 100 parts of a 2:1 mixture of xylol and mineral thinner, and subsequently reducing the ball-milled mixture to a viscosity of 18 seconds in a No. 4 Ford cup with a 2:1 mixture of xylol and mineral thinner. The resulting primer having a 65 to 35 weight ratio of pigment to binder is coated by spraying on phosphatized (Bonderized) steel panels, air-dried 15 to 30 minutes, baked 25 minutes at 375° F., and cooled.

(b) A pigment paste is prepared from a mixture of 44.55 parts of rutile titanium dioxide, 0.45 part of lampblack, 9 parts of a 30% solution of the copolymer of methyl methacrylate containing 5% by weight (based on polymer solids) of the urea derivative of Example E(b)(1) and 36 parts of a 30% solids solution of a poly(methyl methacrylate) in a toluene and 10 parts of 2-ethoxyethyl acetate by making four passes of such mixture through a roller mill.

(c) Then 40 parts of the resulting paste is mixed with 16 parts of the 30% copolymer solution obtained in Example E(b)(1), 64 parts of a 30% solids solution of a poly(methyl methacrylate) in toluene, 12.6 parts of butyl benzyl phthalate and 184 parts of a solvent composed of a 30/35/35 blend of 2-ethoxyethyl acetate, toluene, and methyl ethyl ketone to produce a lacquer having a 12-second #4 Ford cup viscosity.

(d) The lacquer is sprayed over the primed steel panels, air-dried 3 to 5 minutes, and a second spraying of the lacquer is then made. This is then air-dried 15 to 30 minutes and then baked 30 minutes at 180° F.

(e) On testing for adhesion in the manner described above, during the period from 10 to 30 minutes of the completion of baking of the topcoat substantially no removal of the coating occurred. When similar coated panels are prepared in the same way but replacing the copolymer of Example E(b)(1) throughout with corresponding amounts of a poly(methyl methacrylate), the coatings show substantially complete removal on testing. However, when the two methyl methacrylate polymers (namely, the poly(methyl methacrylate) and the copolymer of Example E(b)(1) containing 5% of the urea derivative used in 80:20 proportions to give an overall content of 1.0% of the urea derivative in the blended system) are replaced throughout by a copolymer of 99% by weight of methyl methacrylate and 1.0% by weight of the same urea derivative, the adhesion is better than that of the coatings obtained with poly(methyl methacrylate) but definitely poorer than that of the coatings obtained from the blended polymer system in that substantial areas of the coatings are removed when tested in the same way as described above.

EXAMPLE 2

(a) The procedure of Example 1(a) is repeated except that the 233 parts of a 60% solids solution of epoxyalkyd are replaced by 210 parts of a 60% solids solution in mineral thinner of a linseed oil-modified alkyd obtained by the condensation of phthalic anhydride and glycerine and 28 parts of a 50% solids solution in a 1:1 mixture of xylol and n-butanol of a butylated polymethylol urea. The resulting primer is applied by the procedures of Example 1(a), baked for 45 minutes at 275° F. and cooled.

(b) A pigment paste is prepared from a mixture of 44.55 parts of rutile titanium dioxide, 0.45 part of lampblack, 15.4 parts of a 30% solution of the copolymer of Example E(b)(2) and 29.6 parts of a 30% solids solution of a poly(methyl methacrylate) in toluene and 10 parts 2-ethoxyethyl acetate by making four passes of such mixture through a roller mill.

(c) A lacquer is then prepared by mixing 40 parts of the paste obtained in part (b) with 27.3 parts of the 30% copolymer solution obtained in Example E(b)(2), 52.7 parts of a 30% solids solution of a poly(methyl methacrylate) in toluene, 12.6 parts of butyl benzyl phthalate and 188 parts of a 30/35/35 blend of 2-ethoxy ethyl acetate, toluene and methyl ethyl ketone to produce a lacquer having a 12-second #4 Ford cup viscosity.

(d) The lacquer is sprayed over the primed steel panels, air-dried 3 to 5 minutes, and a second spraying of the lacquer is then made. This is then air-dried 15 to 30 minutes and then baked 30 minutes at 180° F.

(e) On testing for adhesion, 10 to 30 minutes after baking, substantially no removal of coating occurred. When similar panels prepared from a simple copolymer containing an equivalent amount (2.5 wt. percent) of the same adhesion-promoting units, rather than from the blend above, the coatings show substantial removal.

EXAMPLE 3

The procedure of Example 2 is repeated except that in part (b) there is used 9 parts of a 30% solids solution of the copolymer of Example B in place of the corresponding solution of the copolymer of Example E(b)(2) and the amount of 30% solids solution of poly(methyl methacrylate) is increased to 36 parts while in making the lacquer of part (c) 16 parts of a 30% solids solution of the copolymer of Example B is used in place of the corresponding solution of the copolymer of Example E(b)(2) and the amount of 30% solids solution of poly(methyl methacrylate) is increased to 64 parts while the 30/35/35 solvent blend is raised from 188 parts to 224 parts.

The results on testing for adhesion in comparison with a simple copolymer containing an equivalent amount of adhesion-promoting units are similar to those obtained in Example 2.

EXAMPLE 4

A base copolymer is prepared from about 60 parts of n-butyl methacrylate and about 40 parts of methyl methacrylate. A series of modifying copolymers of n-butyl methacrylate and methyl methacrylate were prepared by the process of Example F in which the ratio between these methacrylates is kept at 60:40 by weight and various amounts are included of N-[β-(α-methacryloxyacetamido)ethyl]-N,N'-ethyleneurea (abbreviated MEEU herein). Table I gives the composition, the Gardner-Holdt viscosity at the solids indicated and the composition of the solvents.

*Table I*

| Polymer | Percent MEEU Content | Visc. | Solids, Percent | Percent Toluene | Percent Methyl Cellosolve |
|---|---|---|---|---|---|
| Base | 0 | V+ | 39.5 | 100 | 0 |
| A | 1.25 | U | 39.4 | 97.9 | 2.1 |
| B | 2.5 | U | 39.0 | 95.8 | 4.2 |
| C | .5 | V | 39.9 | 91.6 | 8.4 |
| D | 9.1 | W+ | 39.6 | 83.5 | 16.5 |

Cold-rolled steel plates are cleaned by wiping with cheese-cloth saturated with xylene, using at least two separate clean cloths, then immersing in hot ethylene dichloride, then contacting with the vapor of the dichloride, then contacting with clean liquid ethylene dichloride, and finally contacting with the vapor again. Clear lacquers are prepared by mixing the solution of the base polymer with various proportions indicated in Table II of the various solutions of modifying polymers so that 1.25% of adhesion-promoting groups is present in the total weight of polymer blend in each of the mixtures. Films (about 1 mil thickness) of the clear lacquers are cast on the cleaned steel plates, then dried by exposure to ambient air for 15 to 40 minutes, and baked for 90 minutes at 200° F. and 225° F. respectively. The adhesion is determined on a standard Arco microknife made by Gardner Laboratories, Inc., but the values given are relative, being derived from the actual values obtained on the microknife so that higher values in the table indicate greater adhesion, the adhesion of the film obtained from polymer A after the 200° F. bake being arbitrarily assigned a value of 1.

Table II

| Proportions of Polymers in Mix | | | | | Relative Adhesions | |
|---|---|---|---|---|---|---|
| Base | A | B | C | D | 200° F. Bake | 225° F. Bake |
| ---- | 40 | ---- | ---- | ---- | 1 | 1.9 |
| 20 | ---- | 20 | ---- | ---- | 2.6 | 2.4 |
| 30 | ---- | ---- | 10 | ---- | 3.5 | 4.1 |
| 35 | ---- | ---- | ---- | 5 | 3.7 | 5.2 |

EXAMPLE 5

The procedure of Example 2 is repeated substituting a corresponding amount of the copolymer of Example G (containing 4-vinylpyridine to provide the adhesion-promoting units). No removal of the coating occurs when the coating is subjected to tape-test for adhesion given above.

EXAMPLE 6

(a) The procedure of Example 2 is repeated except that in part (b) there is used 9 parts of a 30% solids solution of the copolymer of Example A in place of the corresponding solution of the copolymer of Example E(b)(2) and in making the lacquer of part (c) 16 parts of a 30% solids solution of the copolymer of Example A in place of the corresponding solution of the copolymer of Example E(b)(2) and the amount of the 30/35/35 solvent blend is raised from 188 parts to 224 parts. The lacquer shows excellent adhesion.

(b) In the same way the copolymers of Examples C, D, and J can be blended with poly(methacrylate) to provide lacquers having excellent adhesion.

EXAMPLE 7

The procedure of Example 2 is repeated substituting a corresponding amount of the copolymer of Example H (containing polymerized units of N-(β-dimethylaminoethyl)acrylamide to provide adhesion-promotion). No removal of the coating occurs when the coating is subjected to the tape-test for adhesion.

EXAMPLE 8

The procedure of Example 2 is repeated substituting a corresponding amount of the copolymer of Example I (containing polymerized units of β-dimethylaminoethyl vinyl ether to provide adhesion-promotion). No removal of the coating occurs when the coating is subjected to the tape test for adhesion.

EXAMPLE 9

Primed steel panels are prepared in part (a) of Example 1. A pigment paste is prepared from a mixture of 44.55 parts of rutile titanium dioxide, 0.45 part of lampblack, 45 parts of the 30% solution obtained in Example K, and 10 parts of 2-ethoxyethyl acetate by making four passes of such mixture through a roller mill.

Then 40 parts of the resulting paste is mixed with 80 parts of the 30% solution obtained in Example K, 12.6 parts of butyl benzyl phthalate, and 184 parts of a solvent composed of a 30/35/35 blend of 2-ethoxyethyl acetate, toluene, and methyl ethyl ketone to produce a lacquer having a 12-second No. 4 Ford cup viscosity.

The lacquer is sprayed over the primed steel panels, air-dried 3 to 5 minutes, and a second spraying of the lacquer is then made. This is then air-dried 15 to 30 minutes and then baked 30 minutes at 180° F. No removal of the coatings occur when they are subjected to the tape-test for adhesion.

EXAMPLE 10

Primed steel panels are prepared as in part (a) of Example 2. A pigment paste is prepared from a mixture of 44.55 parts of rutile titanium dioxide, 0.45 part of lampblack, 45 parts of the 30% solution obtained in Example L, and 10 parts of 2-ethoxyethyl acetate by making four passes of such mixture through a roller mill.

A lacquer is then prepared by mixing 40 parts of the paste obtained with 80 parts of the 30% solution obtained in Example L, 12.6 parts of butyl benzyl phthalate, and 188 parts of a 30/35/35 blend of 2-ethoxyethyl acetate, toluene, and methyl ethyl ketone to produce a lacquer having a 12-second No. 4 Ford cup viscosity.

The lacquer is sprayed over the primed steel panels, air-dried 3 to 5 minutes, and a second spraying of the lacquer is then made. This then is air-dried 15 to 30 minutes and then baked 30 minutes at 180° F. No removal of the coatings occur when they are subjected to the tape-test for adhesion.

EXAMPLE 11

Similar results are obtained when the procedure of Example 9 is repeated replacing in both instances the 30% solution of Example K with the 30% solution obtained in Example M.

EXAMPLE 12

Similar results are obtained when the procedure of Example 9 is repeated replacing in both instances the 30% solution of Example K with the 30% solution obtained in Example O.

EXAMPLE 13

Similar results are obtained when the procedure of Example 10 is repeated replacing in both instances the 30% solution of Example K with the 30% solution obtained in Example N.

It is to be understood that changes and variations may be made without departing from the spirit and scope of the invention as defined by the appended claims.

I claim:

1. A coating composition comprising a solution in an organic solvent medium of a blend of (1) a base polymer of a lower alkyl methacrylate in which the alkyl group has one to two carbon atoms, and (2) a modifying copolymer of a lower alkyl methacrylate in which the alkyl group has one to four carbon atoms with about 2% to 15% by weight of an adhesion-promoting monomer, said base polymer and modifying copolymer being compatible with each other, and the proportions of the base polymer and modifying copolymer being within a range to provide an overall amount of 0.1% to 8% by weight of polymerized units of an adhesion-promoting monomer in the blend, said adhesion-promoting monomer being selected from the group consisting of compounds of Formulas I, II, III, and IV following:

(I) 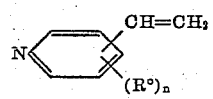

where R° is selected from the group consisting of H and alkyl groups having 1 to 4 carbon atoms, and n is an integer having a value of 1 to 4, (II) 

where

R is selected from the group consisting of H and $CH_3$,
A is selected from the group consisting of O, S,

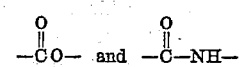

Y is an alkylene group having 2 to 4 carbon atoms,
R¹ is selected from the group consisting of H and an alkyl group having 1 to 4 carbon atoms, and
R² is selected from the group consisting of H and an alkyl group having 1 to 4 carbon atoms, (III)
$$CH_2=C(R)COOCH_2CONHZN\diagup_{\substack{\diagdown NH \\ C \\ \parallel \\ O}}$$

(IV)
$$CH_2=C(R)CONHZN\diagup_{\substack{\diagdown NH \\ C \\ \parallel \\ O}}$$

where R is the same as above, and Z is an alkylene group having 2 to 3 carbon atoms.

2. A coating composition comprising a solution in an organic solvent medium of a blend of (1) a base polymer of a lower alkyl methacrylate in which the alkyl group has one to two carbon atoms, and (2) a modifying copolymer of a lower alkyl methacrylate in which the alkyl group has one to four carbon atoms with about 2 to 15% by weight of N-[β-(α-methacryloxyacetamido)-ethyl]-N,N'-ethyleneurea as an adhesion-promoting monomer, said base polymer and modifying copolymer being compatible with each other, and the proportions of the base polymer and modifying copolymer being within a range to provide an overall amount of 0.1 to 8% by weight of polymerized units of an adhesion-promoting monomer in the blend.

3. A coating composition comprising a solution in an organic solvent medium of a blend of (1) a base polymer of a lower alkyl methacrylate in which the alkyl group has one to two carbon atoms, and (2) a modifying copolymer of a lower alkyl methacrylate in which the alkyl group has one to four carbon atoms with about 2 to 15% by weight of dimethylaminoethyl methacrylate as an adhesion-promoting monomer, said base polymer and modifying copolymer being compatible with each other, and the proportions of the base polymer and modifying copolymer being within a range to provide an overall amount of 0.1 to 8% by weight of polymerized units of an adhesion-promoting monomer in the blend.

4. A coating composition comprising a solution in an organic solvent medium of a blend of (1) a base polymer of a lower alkyl methacrylate in which the alkyl group has one to two carbon atoms, and (2) a modifying copolymer of a lower alkyl methacrylate in which the alkyl group has one to four carbon atoms with about 2 to 15% by weight of dimethylaminoethyl acrylate as an adhesion-promoting monomer, said polymer and modifying copolymer being compatible with each other, and the proportions of the base polymer and modifying copolymer being within a range to provide an overall amount of 0.1 to 8% by weight of polymerized units of an adhesion-promoting monomer in the blend.

5. A coating composition comprising a solution in an organic solvent medium of a blend of (1) a base polymer of a lower alkyl methacrylate in which the alkyl group has one to two carbon atoms, and (2) a modifying copolymer of a lower alkyl methacrylate in which the alkyl group has one to four carbon atoms with about 2 to 15% by weight of dimethylaminoethyl vinyl ether as an adhesion-promoting monomer, said base polymer and modifying copolymer being compatible with each other, and the proportions of the base polymer and modifying copolymer being within a range to provide an overall amount of 0.1 to 8% by weight of polymerized units of an adhesion-promoting monomer in the blend.

6. A coating composition comprising a solution in an organic solvent medium of a blend of (1) a base polymer of a lower alkyl methacrylate in which the alkyl group has one to two carbon atoms, and (2) a modifying copolymer of a lower alkyl methacrylate in which the alkyl group has one to four carbon atoms with about 2 to 15% by weight of 4-vinyl pyridine as an adhesion-promoting monomer, said base polymer and modifying copolymer being compatible with each other, and the proportions of the base polymer and modifying copolymer being within a range to provide an overall amount of 0.1 to 8% by weight of polymerized units of an adhesion-promoting monomer in the blend.

7. A coating composition comprising a solution in an organic solvent medium of a blend of (1) a base polymer of methyl methacrylate, and (2) a modifying copolymer of methyl methacrylate and about 2 to 15% by weight of N-[β-(α-methacryloxyacetamido)ethyl]-N,N'-ethyleneurea as an adhesion-promoting monomer, said base polymer and modifying copolymer being compatible with each other, and the proportions of the base polymer and modifying copolymer being within a range to provide an overall amount of 0.1 to 8% by weight of polymerized units of an adhesion-promoting monomer in the blend.

8. A coating composition comprising a solution in an organic solvent medium of a blend of (1) a base polymer of methyl methacrylate, and (2) a modifying copolymer of methyl methacrylate and about 2 to 15% by weight of dimethylaminoethyl methacrylate as an adhesion-promoting monomer, said base polymer and modifying copolymer being compatible with each other, and the proportions of the base polymer and modifying copolymer being within a range to provide an overall amount of 0.1 to 8% by weight of polymerized units of an adhesion-promoting monomer in the blend.

9. A coating composition comprising a solution in an organic solvent medium of a blend of (1) a base polymer of methyl methacrylate, and (2) a modifying copolymer of methyl methacrylate and about 2 to 15% by weight of dimethylaminoethyl acrylate as an adhesion-promoting monomer, said base polymer and modifying copolymer being compatible with each other, and the proportions of the base polymer and modifying copolymer being within a range to provide an overall amount of 0.1 to 8% by weight of polymerized units of an adhesion-promoting monomer in the blend.

10. A coating composition comprising a solution in an organic solvent medium of a blend of (1) a base polymer of methyl methacrylate, and (2) a modifying copolymer of methyl methacrylate and about 2 to 15% by weight of dimethylaminoethyl vinyl ether as an adhesion-promoting monomer, said base polymer and modifying copolymer being compatible with each other, and the proportions of the base polymer and modifying copolymer being within a range to provide an overall amount of 0.1 to 8% by weight of polymerized units of an adhesion-promoting monomer in the blend.

11. A coating composition comprising a solution in an organic solvent medium of a blend of (1) a base polymer of methyl methacrylate, and (2) a modifying copolymer of methyl methacrylate and about 2 to 15% by weight of 4-vinyl pyridine as an adhesion-promoting monomer, said base polymer and modifying copolymer being compatible with each other, and the proportions of the base polymer and modifying copolymer being within a range to provide an overall amount of 0.1 to 8% by weight of polymerized units of an adhesion-promoting monomer in the blend.

12. A coating composition comprising a solution in an organic solvent medium of a blend of (1) a base polymer of a copolymer of methyl methacrylate and butyl methacrylate, and (2) a modifying copolymer of methyl methacrylate, butyl methacrylate, and about 2 to 15% by weight of N-[β-(α-methacryloxyacetamido)-ethyl]-N,N'-ethyleneurea as an adhesion-promoting monomer, said base polymer and modifying copolymer being compatible with each other, and the proportions of the base polymer and modifying copolymer being within a range to provide an overall amount of 0.1 to 8% by weight of polymerized units of an adhesion-promoting monomer in the blend.

13. An article of manufacture comprising a substrate which is solid at room temperature, and a coating on the substrate comprising a blend of (1) a base polymer of a lower alkyl methacrylate in which the alkyl group has one to two carbon atoms, and (2) a modifying copolymer of a lower alkyl methacrylate in which the alkyl group has one to four carbon atoms with about 2 to 15% by weight of an adhesion-promoting monomer, said base polymer and modifying copolymer being compatible with each other, and the proportions of the base polymer and modifying copolymer being within a range to provide an overall amount of 0.1 to 8% by weight of polymerized units of an adhesion-promoting monomer in the blend, said adhesion-promoting monomer being selected from the group consisting of compounds of Formulas I, II, III, and IV following:

(I) 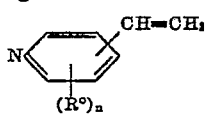

where R° is selected from the group consisting of H and alkyl groups having 1 to 4 carbon atoms, and $n$ is an integer having a value of 1 to 4, (II) 

where

R is selected from the group consisting of H and CH$_3$,
A is selected from the group consisting of O, S,

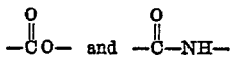

Y is an alkylene group having 2 to 4 carbon atoms,
R$^1$ is selected from the group consisting of H and an alkyl group having 1 to 4 carbon atoms, and
R$^2$ is selected from the group consisting of H and an alkyl group having 1 to 4 carbon atoms, (III) 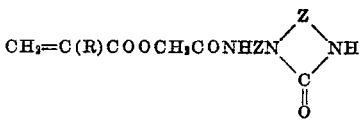

(IV) 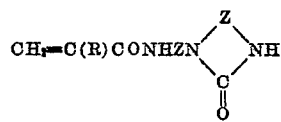

where R is the same as above, and Z is an alkylene group having 2 to 3 carbon atoms.

14. An article as defined in claim 13 in which the substrate is a metal carrying a coating of a baked thermoset resin.

15. An article as defined in claim 14 in which the monomer is N-[β-α-methacryloxyacetamido)ethyl]-N,N'-ethyleneurea.

16. An article as defined in claim 14 in which the monomer is dimethylaminoethyl methacrylate.

17. An article as defined in claim 14 in which the monomer is dimethylaminoethyl acrylate.

18. An article as defined in claim 14 in which the monomer is dimethylaminoethyl vinyl ether.

19. An article as defined in claim 14 in which the monomer is 4-vinyl pyridine.

References Cited in the file of this patent

UNITED STATES PATENTS

| | | |
|---|---|---|
| 2,138,763 | Graves | Nov. 29, 1938 |
| 2,329,456 | Campbell | Sept. 14, 1943 |
| 2,448,542 | McQueen | Sept. 7, 1948 |
| 2,823,140 | Lowell | Feb. 11, 1958 |

UNITED STATES PATENT OFFICE
CERTIFICATE OF CORRECTION

Patent No. 2,940,950

June 14, 1960

Samuel Gusman

It is certified that error appears in the above identified patent and that said Letters Patent are hereby corrected as shown below:

Column 5, line 45, "comonomer" should read -- copolymer --.

Signed and sealed this 24th day of March 1970.

(SEAL)
Attest:

Edward M. Fletcher, Jr.
Attesting Officer

WILLIAM E. SCHUYLER, JR.
Commissioner of Patents